US007008678B2

(12) United States Patent
Chen et al.

(10) Patent No.: US 7,008,678 B2
(45) Date of Patent: *Mar. 7, 2006

(54) ROLLER FOR A FUSING STATION

(75) Inventors: Jiann-Hsing Chen, Fairport, NY (US); Joseph A. Pavlisko, Pittsford, NY (US); Po-Jen Shih, Webster, NY (US); Charles E. Hewitt, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/667,548

(22) Filed: Sep. 22, 2003

(65) Prior Publication Data

US 2004/0120739 A1   Jun. 24, 2004

Related U.S. Application Data

(60) Provisional application No. 60/435,039, filed on Dec. 20, 2002.

(51) Int. Cl.
   *B32B 5/30*    (2006.01)
   *B32B 25/08*   (2006.01)
   *B32B 25/20*   (2006.01)
   *B32B 27/20*   (2006.01)
   *G03G 15/20*   (2006.01)

(52) U.S. Cl. .............. 428/36.8; 428/36.91; 428/313.5; 428/315.9; 428/327; 428/328; 428/421; 428/447; 428/448; 399/333; 492/56

(58) Field of Classification Search .............. 399/333; 492/56; 428/36.8, 36.91, 325, 328, 329, 428/421, 447, 448, 313.5, 315.9, 327
See application file for complete search history.

(56) References Cited

U.S. PATENT DOCUMENTS

| | | | |
|---|---|---|---|
| 3,615,972 A | 10/1971 | Morehouse, Jr. | 156/79 |
| 3,914,360 A | 10/1975 | Gunderman et al. | 264/51 |
| 4,513,106 A | 4/1985 | Edgren et al. | 521/58 |
| 4,984,027 A | 1/1991 | Derimiggio et al. | 355/290 |
| 5,292,606 A | 3/1994 | Fitzgerald | 428/35.8 |
| 5,336,539 A | 8/1994 | Fitzgerald | 428/36.8 |
| 5,450,183 A | 9/1995 | O'Leary | 355/285 |
| 5,464,698 A | 11/1995 | Chen et al. | 428/421 |
| 5,480,724 A | 1/1996 | Fitzgerald et al. | 428/447 |
| 5,595,823 A | 1/1997 | Chen et al. | 428/421 |
| 5,654,052 A | 8/1997 | Visser et al. | 428/35.8 |
| 5,716,714 A | 2/1998 | Chen et al. | 428/473.5 |
| 5,754,931 A | 5/1998 | Castelli et al. | 399/297 |
| 5,916,671 A | 6/1999 | Dauber et al. | 428/317.3 |

(Continued)

OTHER PUBLICATIONS

Hawley's Condensed Chemical Dictionary, 13$^{th}$ Edition, p. 995, Jan. 1999.*

(Continued)

*Primary Examiner*—Ramsey Zacharia
(74) *Attorney, Agent, or Firm*—Carl F. Ruoff

(57) ABSTRACT

A fusing-station member, which member can be a compliant fuser roller or a compliant pressure roller for use in a fusing station of an electrostatographic machine, and which member includes a base cushion layer formed on a core member, with the base cushion layer coated by a thin protective gloss control layer. The base cushion layer is a highly crosslinked addition-polymerized polyorganosiloxane material made by thermally curing, below 100° C., a formulation which includes three types of filler particles, namely hollow flexible microballoon particles, strength-enhancing solid particles, and thermal-conductivity-enhancing solid particles.

35 Claims, 2 Drawing Sheets

U.S. PATENT DOCUMENTS

| | | | |
|---|---|---|---|
| 6,190,771 B1 | 2/2001 | Chen et al. | 428/375 |
| 6,224,978 B1 | 5/2001 | Chen et al. | 428/376 |
| 6,225,409 B1 | 5/2001 | Davis et al. | 525/104 |
| 6,235,801 B1 | 5/2001 | Morales et al. | 521/54 |
| 6,261,214 B1 * | 7/2001 | Meguriya | 492/56 |
| 6,355,352 B1 | 3/2002 | Chen et al. | 428/421 |
| 6,361,829 B1 | 3/2002 | Chen et al. | 427/380 |
| 6,429,249 B1 | 8/2002 | Chen et al. | 524/432 |
| 6,486,441 B1 * | 11/2002 | Chen et al. | 219/216 |
| 6,490,430 B1 | 12/2002 | Chen et al. | 399/333 |
| 2002/0102410 A1 | 8/2002 | Gervasi et al. | 428/421 |

OTHER PUBLICATIONS

Office Action for copending U.S. Appl. No. 10/667,996, mailed Sep. 9, 2004.

Office Action for copending U.S. Appl. No. 10/668,014, mailed Sep. 9, 2004.

Office Action for copending U.S. Appl. No. 10/667,781, mailed Sep. 9, 2004.

* cited by examiner

ROLLER FOR A FUSING STATION

CROSS REFERENCE TO RELATED APPLICATION

Reference is made to and priority claimed from U.S. Provisional Application Ser. No. 60/435,039, filed Dec. 20, 2002, entitled IMPROVED ROLLER FOR A FUSING STATION.

FIELD OF THE INVENTION

The invention relates to electrostatography and to a fusing-station roller and method of making, and in particular to a conformable roller which includes an addition-polymerized highly crosslinked polydimethylsiloxane incorporating both hollow fillers and solid fillers.

BACKGROUND OF THE INVENTION

In electrostatographic imaging and recording processes such as electrophotographic printing, an electrostatic latent image is formed on a primary image-forming member such as a photoconductive surface and is developed with a thermoplastic toner powder to form a toner image. The toner image is thereafter transferred to a receiver member, e.g., a sheet of paper or plastic, and the toner image is subsequently fused or fixed to the receiver member in a fusing station using heat and/or pressure. The fusing station includes a heated fuser member which can be a roller, belt, or any surface having a suitable shape for fixing thermoplastic toner powder to the receiver member. Fusing typically involves passing the toned receiver member between a pair of engaged rollers that produce an area of pressure contact known as a fusing nip. In order to form the fusing nip, at least one of the rollers typically includes a compliant or conformable layer. Heat is transferred from a heated roller fuser member to the toner in the fusing nip, causing the toner to partially melt and attach to the receiver member.

Typically included in a compliant heated fuser member roller is a resilient or elastically deformable base cushion layer (e.g., an elastomeric layer). The base cushion layer is usually covered by one or more concentric layers, including a protective outer layer. The base cushion layer is normally bonded to a core member included in the roller, with the roller having a smooth outer surface. Where the fuser member is in the form of a belt, e.g., a flexible endless belt that passes around the heated roller, it commonly has a smooth outer surface which may also be hardened. Similarly, a resilient base cushion layer can be incorporated into a deformable pressure roller used in conjunction with a relatively hard fuser roller.

Simplex fusing stations attach toner to only one side of the receiver member at a time. In this type of station, the engaged roller that contacts the unfused toner is commonly known as the fuser roller and is a heated roller. The roller that contacts the other side of the receiver member is known as the pressure roller and is usually unheated. Either or both rollers can have a compliant layer on or near the surface. It is common for one of these rollers to be driven rotatably by an external source while the other roller is rotated frictionally by the nip engagement.

In a duplex fusing station, which is less common, two toner images are simultaneously attached, one to each side of a receiver passing through a fusing nip. In such a duplex fusing station there is no real distinction between fuser roller and pressure roller, both rollers performing similar functions, i.e., providing heat and pressure.

It is known that a resilient fuser roller, when used in conjunction with a harder or relatively non-deformable pressure roller, e.g., in a Digimaster 9110 machine made by Heidelberg Digital L.L.C., provides easy release of a receiver member from the fuser roller, because the distorted shape of the compliant surface in the nip tends to bend the receiver member towards the relatively non-deformable unheated pressure roller and away from the much more deformable fuser roller. On the other hand, when a conformable or compliant pressure roller is used to form the fusing nip against a hard fuser roller, such as in a Docutech 135 machine made by Xerox Corporation, a mechanical device such as blade is typically necessary as an aid for releasing the receiver member from the fuser roller.

A deformable fuser roller or pressure roller for use in a fusing station is advantageously provided with a fluorothermoplastic random copolymer outermost coating, as disclosed in the Chen, et al., patent (commonly assigned U.S. Pat. No. 6,355,352 B1) which is hereby incorporated by reference.

The most common type of fuser roller is internally heated, i.e., a source of heat is provided within the roller for fusing. Such a fuser roller generally has a hollow core member, inside of which is located a source of heat, usually a lamp. Surrounding the core member can be an elastomeric layer through which heat is conducted from the core member to the surface, and the elastomeric layer typically contains fillers for enhanced thermal conductivity.

Less common is an externally heated fuser roller, which fuser roller is typically heated by surface contact with one or more heating rollers. An externally heated fuser roller is included in the subject invention. Externally heated fuser rollers are for example disclosed by the O'Leary patent (U.S. Pat. No. 5,450,183, assigned to Eastman Kodak Company, Rochester, N.Y.), the Derimiggio, et al., patent (commonly assigned U.S. Pat. No. 4,984,027), the Aslam, et al., patent application (commonly assigned U.S. patent application Ser. No. 09/680,134), and the Chen, et al., patent (commonly assigned U.S. Pat. No. 6,490,430).

A conventional toner fuser roller includes a rigid cylindrical core member, typically metallic such as aluminum, coated with one or more synthetic layers usually formulated with polymeric materials made from elastomers. An elastically deformable or resilient base cushion layer, which may contain filler particles to improve mechanical strength and/or thermal conductivity, is typically formed on the surface of the core member, which core member may advantageously be coated with a primer to improve adhesion of the resilient layer. Roller cushion layers are commonly made of silicone rubbers or silicone polymers such as, for example, polydimethylsiloxane (PDMS) polymers disclosed, e.g., by the Chen, et al., patent (U.S. Pat. No. 6,224,978, assigned to Eastman Kodak Company, Rochester, N.Y.) which is hereby incorporated by reference.

An externally heated fuser roller is typically made using a relatively soft addition-polymerized silicone rubber material. A suitable addition-polymerized silicone rubber material is for example made from a formulation sold by Emerson and Cuming (Billerica, Mass.) under the trade name S5100, which formulation includes strength-enhancing solid filler particles as well as thermal-conductivity-enhancing solid filler particles. The resulting polymerized silicone rubber material has a thermal conductivity of about 0.16 BTU/ft/hr ($6.6 \times 10^{-4}$ cal/cm/sec). The presence of the thermal-conductivity-enhancing fillers enhances heat transfer from one or more external heating rollers used for the external heating of the fuser roller. Moreover, the thermal-conductivity-enhancing fillers enable intermittent use of an auxiliary heating device located within the roller (see below).

Some roller fusers rely on film splitting of a low viscosity oil to enable release of the toner and (hence) receiver member from the fuser roller. The release oil is typically applied to the surface of the fuser from a donor roller coated with the oil provided from a supply sump. A donor roller is for example disclosed in the Chen, et al., patent (commonly assigned U.S. Pat. No. 6,190,771) which is hereby incorporated by reference.

Release oils (commonly referred to as fuser oils) are composed of, for example, polydimethylsiloxanes. When applied to the fuser roller surface to prevent the toner from adhering to the roller, fuser oils may, upon repeated use, interact with PDMS material included in the resilient layer(s) in the fuser roller, which in time can cause swelling, softening, and degradation of the roller. To prevent these deleterious effects caused by release oil, a thin barrier layer made of, for example, a cured fluoroelastomer and/or a silicone elastomer, is typically formed around the resilient cushion layer, as disclosed in the Davis, et al., patent (U.S. Pat. No. 6,225,409, assigned to Eastman Kodak Company, Rochester, N.Y.) and the Chen, et al., patents (U.S. Pat. Nos. 5,464,698 and 5,595,823, both assigned to Heidelberg Digital, L.L.C., Rochester, N.Y.). A fluoro-thermoplastic random copolymer outermost coating can also be used for this purpose, as disclosed in the Chen, et al., patents (commonly assigned U.S. Pat. Nos. 6,355,352 B1 and 6,361,829 B1).

To rival the photographic quality produced using silver halide technology, it is desirable that electrostatographic multicolor toner images have high gloss. To this end, it is desirable to provide a very smooth fusing member contacting the toner particles in the fusing station. A fuser roller having improved gloss characteristics is disclosed in the Chen, et al., patent application (commonly assigned U.S. patent application Ser. No. 09/608,290). A fluorocarbon thermoplastic random copolymer useful for making a gloss control coating on a fuser roller is disclosed in the Chen, et al., patent (commonly assigned U.S. Pat. No. 6,429,249) which is hereby incorporated by reference.

In the fusing of the toner image to the receiver member, the area of contact of a conformable fuser roller with the toner-bearing surface of a receiver member sheet as it passes through the fusing nip is determined by the amount of pressure exerted by the pressure roller and by the characteristics of the resilient cushion layer. The extent of the contact area helps establish the length of time that any given portion of the toner image will be in contact with and heated by the fuser roller. It is generally advantageous to increase the contact time by increasing the contact area so as to result in a more efficient fusing process. However, unless the effective modulus for deforming a compliant roller in the nip is sufficiently low, high nip pressures are required to obtain a large nip area. Such high pressures can be disadvantageous and cause damage to a deformable roller, e.g., such as pressure set or other damage caused by edges of thick and/or hard receiver members as they enter or leave the nip. Hence a low modulus deformable roller is desirable.

It is known from the Chen, et al., patent (commonly assigned U.S. Pat. No. 5,716,714) that use of a relatively soft deformable fusing-station roller (e.g., a deformable pressure roller having a low effective modulus for deformation) can advantageously reduce the propensity of a fusing station nip to cause wrinkling of receiver members passing through the nip.

One way to try to create a low modulus fusing-station roller is to use a foamed material, e.g., a cured material having an open-cell or a closed-cell foam structure, with the material inclusive of suitable strength-enhancing and/or thermal-conductivity-enhancing fillers. Attempts to utilize such foamed materials, for example as base cushion layers, have not generally been successful, for a number of reasons. The thermal conductivity of closed-cell structures tends to be disadvantageously low, even when squeezed in a fusing nip. Although an open-cell structure can be squeezed relatively flat in a fusing nip, the resilience typically becomes compromised because opposite walls within the foam tend to stick together under the heat and pressure of the nip. Moreover, foamed polymeric materials generally have poor tear strength, and shear strength also tends to be low. As a result, fusing-station rollers incorporating foamed base cushion layers are quite susceptible to damage and tend to age rapidly.

The Visser, et al., patent (commonly assigned U.S. Pat. No. 5,654,052) discloses a conformable fusing-station roller including a cured outer layer of silicone rubber inclusive of thermal-conductivity-enhancing fillers, the fusing performance as measured by a crack width test being improved by incorporation of about 0.5–1% by weight of a medium viscosity unreactive silicone oil into the pre-cure formulation of the layer material. It can be inferred (but not stated in this patent) that the added unreactive silicone oil caused improvement of fusing performance by lowering the modulus of the outer layer. Flexing of the outer layer in the fusing nip at the elevated temperatures associated with fusing disadvantageously causes the unbound unreactive silicone oil molecules to continually migrate to the surface, and hence the benefits associated with the added oil slowly disappear as the reservoir of oil within the outer layer eventually becomes exhausted after long usage of the roller.

As previously mentioned, PDMS cushion layers may include inorganic particulate fillers, such as for example solid fillers made of metals, metal oxides, metal hydroxides, metal salts, and mixtures thereof. Solid filler particles may also be included in a barrier layer. For example, the Chen, et al., patent (U.S. Pat. No. 5,464,698, assigned to Heidelberg Digital, L.L.C., Rochester, N.Y.) incorporated herein by reference discloses a toner fuser member having a silicone rubber cushion layer and an overlying barrier layer of a cured fluorocarbon polymer in which is dispersed a filler comprising a particulate mixture that includes tin oxide. The thermal conductivity of these layers, attainable by the use of one or more suitable particulate fillers, is determined by the filler concentration. The thermal conductivity of most polymers is very low and the thermal conductivity generally increases as the concentration of thermally conductive filler particles is increased. However, if the filler concentration is too high, the mechanical properties of a polymer are usually compromised. For example, the stiffness of the synthetic layers may be increased by too much filler so that there is insufficient compliance, e.g., so as to create a wide enough nip for proper fusing. Moreover, too much filler will cause the synthetic layers to have a propensity to delaminate or crack or otherwise cause failure of the roller. Because the mechanical requirements of an internally heated fuser roller require that the filler concentrations generally be moderate, the abilities of the layers to transport heat are thereby limited. In fact, the total concentration of strength-enhancing and thermal-conductivity-enhancing in prior art internally heated compliant fuser rollers has reached a practical maximum. As a result, the number of copies that can be fused per minute is limited, and this in turn can be the limiting factor in determining the maximum throughput rate achievable in an electrostatographic printer. There is a need, therefore, to provide an improved fusing station for increasing the number of prints that can be fused per minute, thereby providing an opportunity for higher machine productivity.

An auxiliary internal source of heat may optionally be used with an externally heated fuser roller, e.g., as disclosed in the Aslam, et al., patent application (commonly assigned U.S. patent application Ser. No. 09/680,134) and in the Chen, et al., patent (commonly assigned U.S. Pat. No. 6,490,430). Such an internal source of heat is known to be useful when the fusing station is quiescent and/or during startup when relatively cold toned receiver members first arrive at the fusing station for fusing therein. In order for such an auxiliary internal source of heat to be effective (when intermittently needed) the fuser roller must have a sufficiently large thermal conductivity. However, this requirement conflicts with a need to keep heat at the surface of an externally heated fuser roller, i.e., so as not to unnecessarily conduct heat into the interior which would compromise the fusing efficiency of the roller. On the other hand, it is important to have a high enough thermal conductivity at the surface of the fuser roller to ensure efficient transfer of heat to the fuser roller from one or more heating rollers contacting the surface. Moreover, in order to have high efficiency, externally heated fuser rollers rely to a certain extent on thermal conduction of heat around the surface of the roller.

Ways to improve upon the above-described limitations associated with externally heated elastically deformable fuser rollers (including an optional auxiliary internal source of heat) are disclosed in the Chen, et al., patent applications (commonly assigned U.S. patent application Ser. Nos. 10/139,486 and 10/139,464). In the Chen, et al., commonly assigned U.S. patent application Ser. No. 10/139,486, an externally heated fuser roller having improved efficiency includes a core member, a base cushion layer around the core member, a relatively thin heat storage layer around the base cushion layer, and an outer gloss control layer around the heat storage layer, wherein the heat storage layer is loaded with more thermally conductive filler than is the base cushion layer and hence has a higher thermal conductivity. In the Chen, et al., commonly assigned U.S. patent application Ser. No. 10/139,464, a thin heat distribution layer is further included between the heat storage layer and the outer gloss control layer. While the fusing efficiencies relating to commonly assigned U.S. patent application Ser. Nos. 10/139,486 and 10/139,464 are much improved, the fuser rollers (respectively having 3-layer and 4-layer structures around the core member) are relatively expensive to manufacture, and are susceptible to delamination with prolonged use.

It is known that instead of solid fillers, certain hollow fillers can be included in an addition-polymerized silicone rubber for purpose of lowering rather than increasing the thermal conductivity of a deformable fuser roller, as disclosed in the Meguriya patent (U.S. Pat. No. 6,261,214, assigned to Shin-Etsu Chemical Company, Ltd., Tokyo, Japan). The silicone rubber is made from raw materials, inclusive of the hollow filler particles, by curing at temperatures higher than 100° C. so as to result in a thermal conductivity of up to $5 \times 10^{-4}$ cal/cm/sec (up to 0.12 BTU/ ft/hr), with the thermal conductivity preferably lower than $5 \times 10^{-4}$ cal/cm/sec. In particular, the Meguriya patent discloses incorporation into the silicone rubber of hollow filler particles (also known as microballoons) manufactured under the trade name EXPANCEL® available from Expancel, located in Duluth, Ga., and Sundsvall, Sweden. Expancel is a part of the business unit Casco Products, within Akzo Nobel, in the Netherlands. Only hollow fillers are disclosed in the Meguriya patent.

Hollow microballoons are well known and are disclosed for example in the Morehouse, et al., patent (U.S. Pat. No. 3,615,972, assigned to Dow Chemical Company, Midland, Mich.). Microballoons are made from thermoplastic microspheres which encapsulate a liquid blowing agent, typically a hydrocarbon liquid. Such microspheres are made in unexpanded form. The walls of the unexpanded microspheres are generally impermeable to the liquid blowing agent, i.e., diffusion of molecules of the liquid blowing agent through the walls is typically negligible. An expanded form of a microsphere, i.e., a microballoon, is obtained by heating an unexpanded microsphere to a suitable temperature so as to vaporize the blowing agent, thereby causing the microsphere to grow to a much larger size. Too high a heating temperature can result in some loss of internal vapor pressure and a shrinking of the microballoon. Methods for expanding microspheres are disclosed in numerous patents, such as for example the Gunderman, et al., patent (U.S. Pat. No. 3,914,360, assigned to Dow Chemical Company, Midland, Mich.), the Edgren, et al., patent (U.S. Pat. No. 4,513,106, assigned to KemaNord AB, Stockholm, Sweden) and the Morales, et al., patent (U.S. Pat. No. 6,235,801 B1). Expansion is generally irreversible after cooling, and the expanded microballoon form is stable under normal ambient conditions and can be sold as a dry powder or alternatively as a slurry in a liquid vehicle. Expanded microspheres or microballoons which are available commercially can be incorporated into various materials, such as for example to make improved paints or lightweight parts. Unexpanded microspheres are also available commercially for incorporation into various types of materials (e.g., expandable inks) or for manufacture of solid parts, e.g., by thermal curing in a mold so as to expand the microspheres. The shell material of certain microsphere particles can include finely divided inorganic particles, e.g., silica particles.

The use of microspheres in a compressible layer of a digital printing blanket carcass is disclosed in the Castelli et al. patent (U.S. Pat. No. 5,754,931, assigned to Reeves Brothers, Incorporated, Spartanburg, S.C.). The microspheres are uniformly distributed in a matrix material which includes thermoplastic or thermosetting resins.

There remains a need to provide for an electrostatographic machine an improved fusing station having high fusing productivity and/or low fusing pressure in a fusing nip. There is also a need to reduce the frequency of fusing artifacts, such as wrinkling of receiver members passing through the fusing nip.

In particular, there remains a need for an improved conformable fuser roller for use with a relatively hard pressure roller, either an externally heated fuser roller that can be intermittently and efficiently heated by an auxiliary internal source of heat, or an internally heated roller. Specifically, such an improved fuser roller preferably includes an addition-polymerized silicone rubber base cushion layer having a thermal conductivity similar to that of comparable prior art externally heated fuser rollers, the improvement shown as a roller which is more conformable, i.e., has a lower modulus than comparable prior art externally heated fuser rollers.

Moreover, there remains a need for an improved conformable pressure roller for use with a relatively hard fuser roller. A particular need is for an improved pressure roller including an addition-polymerized silicone rubber base cushion layer.

SUMMARY OF THE INVENTION

The invention provides an improved fusing-station member, incorporating flexible hollow filler particles, for use in a fusing station of an electrostatographic machine. The fusing-station member includes a fuser roller and a pressure roller. The fusing station includes a fusing nip wherein a toner image is fixed to a receiver member being moved through the fusing nip. The improved fusing-station member can provide an increased fusing efficiency and/or a reduced frequency of fusing artifacts such as wrinkling of the receiver member.

In one embodiment, the fusing-station member is an externally heated compliant fuser roller forming a fusing nip with a relatively hard pressure roller, which fuser roller is preferably provided with an auxiliary internal heat source. The fuser roller includes a core member, a base cushion layer formed around the core member, and a thin protective outer layer coated on the base cushion layer. The base cushion layer is a highly crosslinked addition-polymerized polyorganosiloxane material made by curing, below 100° C., a formulation which includes three types of filler particles, namely hollow flexible microballoon particles, strength-enhancing solid particles, and thermal-conductivity-enhancing solid particles. In an alternative embodiment, the fuser roller is internally heated, the base cushion layer having a relatively high thermal conductivity.

In another embodiment, the fusing-station member is a compliant pressure roller forming a fusing nip with a relatively hard fuser roller. The pressure roller includes a core member, a base cushion layer formed around the core member, and a thin protective outer layer coated on the base cushion layer. The base cushion layer is a highly crosslinked addition-crosslinked polyorganosiloxane material made by curing, below 100° C., a formulation which includes filler particles in the form of hollow flexible microballoon particles and strength-enhancing solid filler particles.

The invention, and its objects and advantages, will become more apparent in the detailed description of the preferred embodiment presented below.

BRIEF DESCRIPTION OF THE DRAWINGS

In the detailed description of the preferred embodiments of the invention presented below, reference is made to the accompanying drawings in which the relative relationships of the various components are illustrated. For clarity of understanding of the drawings, relative proportions depicted or indicated of the included elements may not be representative of the actual proportions, and some of the dimensions may be selectively exaggerated.

DETAILED DESCRIPTION OF THE PREFERRED EMBODIMENTS

Figure 1:
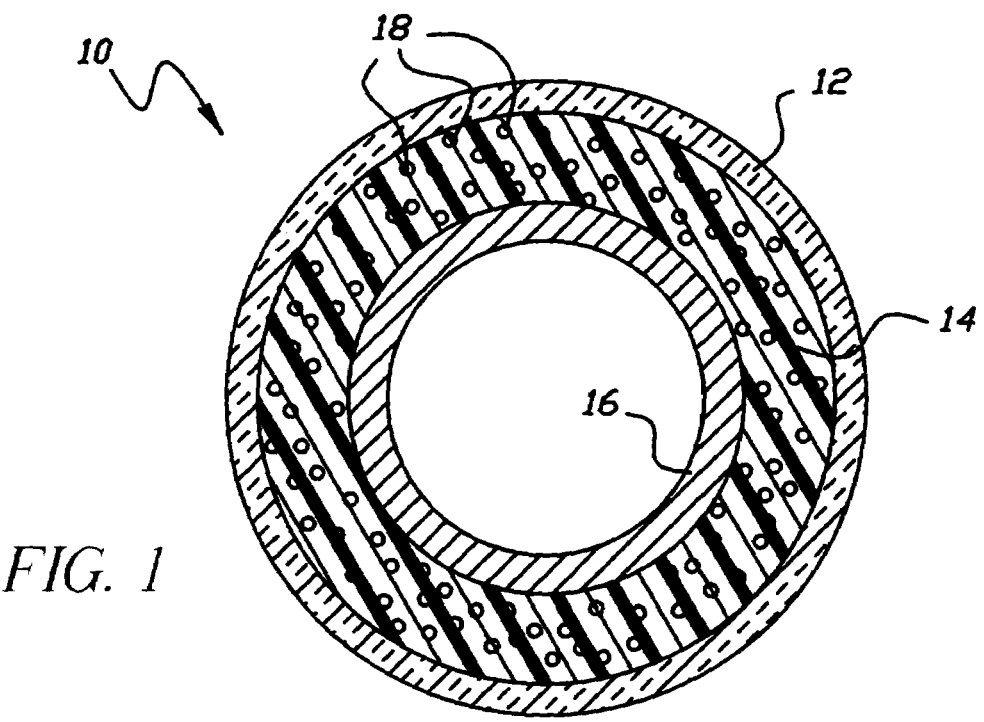
FIG. 1 shows a cross-sectional view of a fusing-station roller in the form of a fuser roller of the invention.

Fusing stations and fusing-station rollers for use according to this invention are readily includable in typical electrostatographic reproduction or printing machines of many types, such as for example electrophotographic color printers.

The invention relates to an electrostatographic machine for forming a toner image on a receiver member and utilizing a fusing station for thermally fusing or fixing the unfused toner image to the receiver member, e.g., a paper or a plastic sheet. The fusing station, which includes a heated fuser member forming a fusing nip with a pressure member, applies heat and pressure to fix the unfused toner image carried on the receiver member as the receiver member is moved through the fusing nip. At least one of the fuser member and the pressure member is a compliant or elastically deformable member. The compliant member can be a roller, belt, or any surface having a suitable deformable shape useful for fixing thermoplastic toner powder to the receiver member. A fuser member and a pressure member are referred to herein as fusing-station members, e.g., fusing-station rollers. One of a fusing-station fuser roller and a fusing-station pressure roller is preferably a compliant roller and the other a relatively hard roller.

In certain embodiments, the fusing-station roller is a compliant externally heated deformable fuser roller for use with a relatively hard pressure roller, which fuser roller preferably includes an auxiliary internal heat source. In alternative embodiments, the fuser roller is preferably internally heated and is made with compliant material that has a relatively high thermal conductivity. In other embodiments, the fusing-station roller is a compliant deformable pressure roller for use with a relatively hard fuser roller, which relatively hard fuser roller can be externally heated or internally heated as may be suitable. An important feature of these deformable fuser roller embodiments and deformable pressure roller embodiments is that each such deformable roller includes a compliant layer preferably incorporating hollow filler particles and at least one type of solid filler particles.

The fusing station preferably includes the fuser roller and the pressure roller in frictional driving relation. Typically, one of the rollers is rotated via a motor, and the other roller is frictionally rotated by engagement in the fusing nip, wherein the fuser roller comes into direct contact with the unfused toner image as the receiver member is moved through the nip. An externally heated fuser roller is preferably directly heated by a dedicated external source of heat, such as by contact with one or more external heating rollers, in well known manner. Alternatively, an externally heated fuser roller may be heated via absorbed radiation, e.g., as provided by one or more lamps, or by any other suitable external source of heat. An internally heated fuser roller includes an internal heat source, such as a lamp, as is well known. The pressure roller, which preferably is not directly heated, is typically indirectly heated to a certain extent via contact in the fusing nip.

Preferably, an oiling mechanism is provided for applying a fuser oil or release oil to the surface of the fuser roller, as is well known. For example, the oiling mechanism can be a donor roll mechanism for applying a silicone oil, e.g., from a sump included in the donor roll mechanism. The fuser oil thus applied by the oiling mechanism serves to release a receiver member carrying a fused image from the fuser roller after passage of the receiver member through the fusing nip. The fuser oil is also used for the purpose of preventing offset, whereby melted toner material can be disadvantageously deposited on the fuser roller.

It is preferred for a cleaning station of a known type to be provided for cleaning the surface of the fuser roller. Additionally or alternatively, a cleaning station can be provided for cleaning the surface of the pressure roller.

The toner image in an unfused state may include a single-color toner or it may include a composite image of at least two single-color toner images, e.g., a composite image in full color made for example from superimposed black, cyan, magenta, and yellow single-color toner images. The unfused toner image is previously transferred, e.g., electrostatically, to the receiver member from one or more toner image bearing members such as primary image-forming members or intermediate transfer members. It is well established that for high quality electrostatographic color imaging with dry toners, small toner particles are necessary.

Fusing-station rollers of the invention are suitable for the fusing of dry toner particles having a mean volume weighted diameter in a range of approximately between 2 $\mu$m–9 $\mu$m, and more typically, about 7 $\mu$m–9 $\mu$m, but the invention is not limited to these size ranges. The fusing temperature to fuse such particles included in a toner image on a receiver member is typically in a range of 100° C.–200° C., and more usually, 140°–180° C., but the invention is not limited to these temperature ranges.

The electrostatographic reproduction or printing may utilize a photoconductive electrophotographic primary image-forming member or a non-photoconductive electrographic primary image-forming member. Particulate dry or liquid toners may be used.

Turning now to FIG. 1, a cross-sectional view of a fusing-station member is illustrated in the form of a fuser roller embodiment of the invention, identified by the numeral 10. Fuser roller 10 includes externally heated embodiments and internally heated embodiments. The fuser roller 10 is a compliant roller preferably for use with a relatively hard pressure roller. Fuser roller 10 includes a substrate in the form of a core member 16, a base cushion layer 14 formed on the core member, and a protective layer or gloss control layer 12 coated on the base cushion layer. As described in detail below, an important feature of the fuser roller 10 is the presence of flexible hollow filler particles 18 incorporated in base cushion layer 14.

The core member 16 is preferably rigid and preferably made of a thermally conductive material such as a metal, preferably aluminum, and has a cylindrical outer surface. The core member is typically (but not necessarily) generally tubular, as shown. Preferably an outer diameter of the core member is in a range of between about 5 inches–7 inches, and the outer diameter is more preferably about 6.0 inches. The base cushion layer 14 and the protective or gloss control layer 12 are preferably successively formed on the core member 16 by using suitable coating techniques and successive post-coating curings and grindings as may be necessary. The outer protective layer (gloss control layer) 12 is preferably made of a low surface energy material such as for example a fluorocarbon polymer, and preferably has a very smooth surface suitable for glossing the fused toner image.

Fuser roller 10, when being utilized in a fusing station, forms a fusing nip with a preferably relatively hard pressure roller in well known fashion (pressure roller and fusing nip not illustrated in FIG. 1). It is important to have a contact width in the fusing nip which is large so as to effect efficient transfer of heat from fuser roller 10 to a toner image carried on a receiver member moved through the nip. Fuser roller 10 (in which base cushion layer 14 includes the flexible hollow filler particles 18 mentioned above) can generally be operated at considerably lower pressure in the fusing nip than an otherwise similar fuser roller having no included flexible hollow filler particles. As a result, fuser roller 10 when operated at such a reduced pressure is advantageously less susceptible to being damaged by receiver members passing through the fusing nip than otherwise would be the case at higher (unreduced) pressure. For a reduced pressure mode of operation using the subject fuser roller, a preferred contact width in the fusing nip (measured perpendicular to the fuser roller rotational axis) is in a range of approximately between 13 mm–22 mm. On the other hand, the fuser roller 10 can be operated at a higher pressure and thus provide a correspondingly higher throughput rate of receiver members through the fusing station. For a higher throughput mode of operation using the subject fuser roller with unreduced nip pressure (e.g., at a pressure typically used when an otherwise similar base cushion layer does not include flexible hollow filler particles) the preferred contact width in the fusing nip can be significantly larger, e.g., in a range of approximately between 20 mm–28 mm. It is a feature of the invention that operational fusing pressure and throughput rate can be advantageously traded off against one another for differing fusing requirements as may be suitable. For example, a lower throughput rate can be used with a lower nip pressure for thick receiver members.

It is preferred to provide an externally heated embodiment of fuser roller 10 with an auxiliary internal heat source, such as a tubular lamp located in the interior of core member 16 (lamp not illustrated in FIG. 1). Intermittent or variable operation of the auxiliary internal heat source can be controlled by a programmable power supply (not shown) so as to augment or supplant the external heating of fuser roller 10. For example, the auxiliary internal heat source can be turned on when the electrostatographic machine is in standby mode in order to keep the fuser roller 10 suitably warm, so that when the machine is restarted the external heating in conjunction with the internal heating can rapidly restore steady state thermal conditions for fusing. Conversely, when steady state has been achieved after a start-up, any auxiliary heating can be reduced or shut off as may be necessary. The auxiliary internal heat source can also be suitably activated so as to avoid a fusing defect known as "droop", which is the result of inadequate fusing caused by a thermal transient when cold receiver members first enter the fusing nip.

An internally heated embodiment of fuser roller 10 includes an internal source of heat, preferably a heated tubular lamp or an ohmically heated element located in the interior of core member 16.

Base cushion layer (BCL) 14 is preferably a highly crosslinked addition-polymerized polyorganosiloxane material. BCL 14 is made by curing, preferably at temperatures below 100° C., a siloxane formulation which preferably includes three types of filler particles, namely, flexible hollow filler particles, strength-enhancing solid particles, and thermal-conductivity-enhancing solid particles. The flexible hollow filler particles used in the formulation are preferably commercially available microballoon particles, made in the form of an expanded powder by prior thermal expansion of unexpanded microspheres which encapsulate a liquid blowing agent (see Morehouse et al., U.S. Pat. No. 3,615,972, assigned to Dow Chemical Company, Midland, Mich.). The polyorganosiloxane material of BCL 14 is preferably a polydimethylsiloxane.

The microballoon particles used for BCL 14 are preferably made from a polymeric material polymerized as a homopolymer or as a copolymer from one or more of the following group of monomers: acrylonitrile, methacrylonitrile, acrylate, methacrylate, and vinylidene chloride. However, any suitable monomer may be used.

The walls of preferably expanded microballoon particles useful for making BCL 14 can include finely divided solid particles. Inorganic particles, e.g., oxide particles, or any other suitable finely divided inorganic particles, can be included in the walls. Preferred oxide particles are silica particles. Additionally or alternatively, the microballoon walls may include finely divided organic polymeric particles.

Inasmuch as a preferred curing temperature for a base cushion layer is relatively low according to the invention (less than 100° C.), it is generally preferable to include expanded microballoons in the uncured formulation. It is not generally feasible to include unexpanded microspheres in the uncured formulation, because temperatures needed for expanding the microspheres are typically higher than 100° C. In particular, in order to be able to use known types of unexpanded microspheres to create (during curing) relatively large expanded microballoons useful for the invention, e.g., having diameters in excess of 80 μm, the curing temperatures for known materials would need to be much higher than 100° C. Nevertheless, an uncured formulation for making BCL 14 can include unexpanded microspheres as may be feasible.

A relatively narrow size distribution of microballoon particles (in pre-expanded form) can be used to make BCL 14. Alternatively, a bimodal distribution or a broad size distribution can be used. A bimodal distribution can, for example, be made by incorporating two relatively narrow size distributions of expanded microballoons into the uncured formulation. Various sizes of expanded microballoons are commercially available, so that a wide variety of tailored size distributions can be assembled and employed in uncured formulations for making BCL 14. In particular, expanded microballoons for use in the invention are obtainable from Expancel, located in Duluth, Ga. and Sundsvall, Sweden.

Flexible microballoon particles included in an uncured organosiloxane formulation for making BCL 14 can have any suitable diameter(s). It is preferred that the included microballoons have diameters of up to approximately 120 μm.

The flexible microballoon particles included in an uncured organosiloxane formulation for making BCL 14 preferably have a predetermined hollow-filler concentration in a range of approximately between 0.25%–3% by weight (w/w), and more preferably, 0.5%–1.5% (w/w). A preferred concentration by volume of hollow flexible microballoon particles included in an uncured organosiloxane formulation is preferably in a range of approximately between 20%–80% (v/v).

For an externally heated embodiment of fuser roller 10, a preferred concentration by weight of strength-enhancing solid particles (sometimes referred to as structural fillers) in an uncured organosiloxane formulation for making BCL 14 is in a range of approximately between 15%–40% (w/w).

For 0.25% (w/w) of hollow flexible microballoon particles in an uncured organosiloxane formulation to make base cushion layer 14 for inclusion in an externally heated embodiment of fuser roller 10, the strength-enhancing solid filler particles have a concentration by volume in the uncured formulation preferably in a range of approximately between 8%–24% (v/v). For 3% (w/w) of the microballoon particles, the strength-enhancing particles have a concentration by volume in the uncured formulation preferably in a range of approximately between 2%–7% (v/v). Therefore, the preferred range for volume percentage of strength-enhancing solid particles in such uncured organosiloxane formulations is approximately between 2%–24% (v/v). However, any suitable volume percentage of strength-enhancing solid particles may be used in an uncured organosiloxane formulation for a base cushion layer 14 included in an externally heated embodiment of fuser roller 10.

A preferred concentration by weight of thermal-conductivity-enhancing solid particles in an uncured organosiloxane formulation for making BCL 14 is in a range of approximately between 10%–40% (w/w).

For 0.25% (w/w) of hollow flexible microballoon particles in an uncured organosiloxane formulation to make base cushion layer 14 for inclusion in an externally heated embodiment of fuser roller 10, the thermal-conductivity-enhancing solid filler particles in the uncured formulation have a concentration by volume preferably in a range of approximately between 4%–24% (v/v). For 3% (w/w) of the microballoon particles, the thermal-conductivity-enhancing particles in the uncured formulation have a concentration by volume preferably in a range of approximately between 1%–7% (v/v). Therefore, the preferred range for volume percentage of thermal-conductivity-enhancing solid particles in such uncured organosiloxane formulations is approximately between 1%–24% (v/v). However, any suitable volume percentage of thermal-conductivity-enhancing solid particles may be used in an uncured organosiloxane formulation for a base cushion layer 14 included in an externally heated embodiment of fuser roller 10.

For an internally heated embodiment of fuser roller 10, an uncured polyorganosiloxane formulation for making addition-polymerized BCL 14 has a predetermined hollow-filler concentration of flexible microballoon particles preferably in a range of approximately between 0.25%–3.0% by weight, a concentration of strength-enhancing solid filler particles preferably in a range of approximately between 5%–10% by weight, and a concentration of thermal-conductivity-enhancing solid filler particles preferably in a range of approximately between 40%–70% by weight.

Strength-enhancing solid filler particles are preferably silica particles, e.g., mineral silica particles or fumed silica particles. Other strength-enhancing solid fillers which can be included are particles of zirconium oxide, boron nitride, silicon carbide, and tungsten carbide. The strength-enhancing particles preferably have a mean diameter in a range of approximately between 0.1 μm–100 μm, and more preferably, a mean diameter between 0.5 μm and 40 μm.

Preferred thermal-conductivity-enhancing solid filler particles include particles of aluminum oxide, iron oxide, copper oxide, calcium oxide, magnesium oxide, nickel oxide, tin oxide, zinc oxide, graphite, carbon black, or mixtures thereof. The thermal-conductivity-enhancing particles preferably have a mean diameter in a range of approximately between 0.1 μm–100 μm, and more preferably, a mean diameter between 0.5 μm and 40 μm. In a preferred embodiment, BCL 14 includes aluminum oxide thermal-conductivity-enhancing particles.

When an internal auxiliary heat source is preferably included in an externally heated embodiment of fuser roller 10, the base cushion layer 14 needs to have a sufficiently high thermal conductivity for the auxiliary heater to be effective, but not so high as to drain an excessive amount of heat from the externally heated surface of the roller. Therefore, the base cushion layer 14 in an externally heated embodiment of fuser roller 10 preferably has a thermal conductivity less than 0.5 BTU/hr/ft/° F., and more preferably, in a range of approximately between 0.12 BTU/hr/ft/° F.–0.4 BTU/hr/ft/° F.

Base cushion layer 14 in an externally heated embodiment of fuser roller 10 preferably has a Shore A durometer in a range of approximately between 30–50.

Base cushion layer 14 in an externally heated embodiment of fuser roller 10 preferably has a thickness in a range of approximately between 0.05 inch–0.35 inch.

Base cushion layer 14 in an internally heated embodiment of fuser roller 10 preferably has a thermal conductivity in a range of approximately between 0.12 BTU/hr/ft/° F.–0.7 BTU/hr/ft/° F., and more preferably, in a range of approximately between 0.2 BTU/hr/ft/° F.–0.5 BTU/hr/ft/° F.

Base cushion layer 14 in an internally heated embodiment of fuser roller 10 preferably has a Shore A durometer in a range of approximately between 30–75, and more preferably in a range of approximately between 50–70.

Base cushion layer 14 in an externally heated embodiment of fuser roller 10 preferably has a thickness in a range of approximately between 0.03 inch–0.3 inch, and more preferably in a range of approximately between 0.1 inch–0.2 inch.

The gloss control or outer protective layer 12 is preferably formed on the base cushion layer 14 by any suitable coating method including ring coating and blade coating. Gloss control layer (GCL) 12 preferably has a very smooth surface suitable for glossing the fused toner image is preferably made with any chemically unreactive, low surface energy, flexible, polymeric material suitable for high temperature use, such as for example a fluoropolymer. A preferred polymeric material for inclusion in GCL 12 is a fluorocarbon thermoplastic random copolymer, preferably a copolymer of vinylidene fluoride, tetrafluoroethylene and hexafluoropropylene as disclosed in the Chen, et al., patent (commonly assigned U.S. Pat. No. 6,355,352 B1), the fluorocarbon thermoplastic random copolymer having subunits of:

wherein,
x is from 1 to 50 or from 60 to 80 mole percent,
y is from 10 to 90 mole percent,
z is from 10 to 90 mole percent,
x+y+z equals 100 mole percent.

The gloss control layer 12 may have any suitable thickness and may include one or more particulate fillers. It is preferred that the one or more particulate fillers of GCL 12 include zinc oxide particles and fluoroethylenepropylene (FEP) resin particles. However, in substitution of or in addition to the aforementioned one or more particulate fillers, any other particulate filler material may be included in gloss control layer 12, either singly or in combination. It is necessary for good glossing of a toner image to keep the filler concentration relatively low and the particle size of the filler small, so that a matte effect on the toner image due to filler particles at the surface of GCL 12 can be minimized. A filler used in the formulation of GCL 12 preferably has a particle size in a range of approximately between 0.1 µm–10 µm, and more preferably 0.1 µm–2.0 µm. The total concentration of fillers included in gloss control layer 12 is preferably less than about 20% by weight. Specifically, in a preferred formulation of GCL 12 which includes zinc oxide and FEP particles, the concentration of zinc oxide is in a range of approximately between 5%–7% w/w, and the concentration of FEP particles is in a range of approximately between 7%–9% w/w. Preferably, the thickness of the gloss control layer 12 is in a range of approximately between 0.001 inch–0.004 inch, and more preferably 0.0015 inch–0.0025 inch. The thermal conductivity of GCL 12 is preferably no less than approximately 0.07 BTU/hr/ft/° F., and more preferably in a range of approximately between 0.08 BTU/hr/ft/° F.–0.11 BTU/hr/ft/° F.

In an alternative embodiment, GCL 12 can be a layer made of a fluoroelastomer material, e.g., a Viton® material, as disclosed for example in the Chen, et al., patents (U.S. Pat. Nos. 5,464,698 and 5,595,823 assigned to Heidelberg Digital, L.L.C., Rochester, N.Y.).

As an alternative to fuser roller 10, the fuser member can be in the form of a flexible web (not illustrated). This web is heated for fusing in any suitable way. For example, the web can be pressed against the pressure roller by a heated back-up roller in the fusing station, such that a receiver member is moved between the web and the pressure roller for fixing a toner image thereto. The web preferably includes an elastically deformable or resilient base cushion layer coated on any suitable substrate and subsequently overcoated with any suitable protective layer or gloss control layer, wherein the resilient layer includes microballoons and has a composition preferably similar to that of base cushion layer 14. Thus the resilient layer is made by addition polymerization, at curing temperatures less than 100° C., of an organosiloxane formulation including flexible hollow filler particles and suitable solid fillers, such as thermal-conductivity-enhancing solid filler particles and strength-enhancing solid filler particles. The organosiloxane formulation used for the flexible web is preferably a dimethylsiloxane formulation.

A preferred relatively hard pressure roller (not illustrated) for use with an externally heated embodiment of compliant fuser roller 10 includes a core member with a base cushion layer preferably formed on the core member and a topcoat layer on the base cushion layer. The core member of the relatively hard pressure roller is preferably an aluminum cylinder having an outer diameter in a range between about 3 inches–4 inches. The base cushion layer of the relatively hard pressure roller preferably has a thickness in a range of approximately between 0.18 inch–0.22 inch. The thermal conductivity of the base cushion layer, while not critical, is preferred to be small enough so as not to drain a critical amount of heat from the fusing nip. A preferred base cushion layer of the relatively hard pressure roller is made of any elastomeric material for use at an elevated temperature, which base cushion layer has a suitable thermal conductivity and a Shore A durometer greater than about 50, and preferably greater than about 60. The base cushion layer may include a particulate filler. Preferably, the base cushion layer is made of a highly crosslinked polydimethysiloxane elastomer. The topcoat layer, preferably having a thickness in a range of approximately between 0.001 inch–0.004 inch, is preferably made of a fluoropolymer, such as for example the fluorocarbon thermoplastic random copolymer of vinylidene fluoride, tetrafluoroethylene and hexafluoropropylene disclosed in the Chen, et al., patents (commonly assigned U.S. Pat. Nos. 6,355,352 B1 and 6,429,249). In an alternative embodiment of the relatively hard pressure roller, there is no base cushion layer, the core member being preferably made of any rigid material having a suitably low thermal conductivity and the core member coated with any suitable outer layer such as a wear-resistant layer, the wear-resistant layer preferably made of a polymeric material stable at high temperature and resistant to damage by fuser oil.

A fusing station including the above-described relatively hard pressure roller and a novel externally heated embodiment of compliant fuser roller 10 advantageously provides increased fusing station efficiency (throughput) and greatly reduces a frequency of wrinkling of receiver members passing through the fusing nip. This improved performance is due to a lowered modulus (Shore A durometer) resulting from incorporation of hollow microballoons into base cushion layer 14. In addition to these advantages, fuser roller 10 has a relatively simple construction. Moreover, curing of the base cushion layer 14 advantageously requires only a relatively low temperature.

Figure 2:
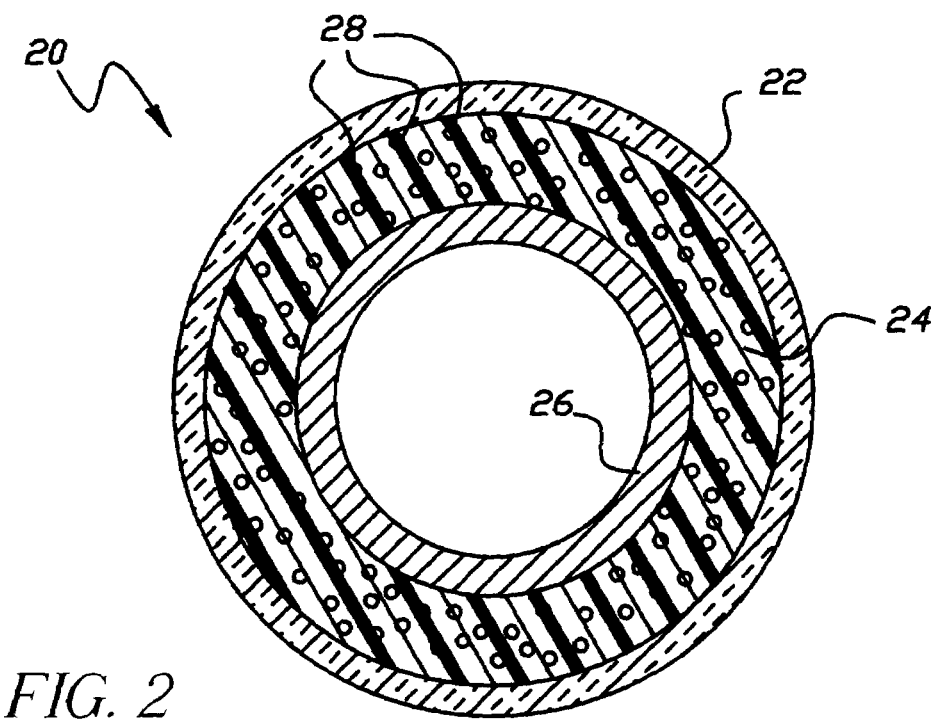
FIG. 2 shows a cross-sectional view of a fusing-station roller in the form of a pressure roller of the invention.

Turning now to FIG. 2, a cross-sectional view of a fusing-station member is illustrated in the form of a pressure roller embodiment of the invention, identified by the numeral 20. Pressure roller 20, which is compliant, is preferably for use with a relatively hard fuser roller. The pressure roller 20 includes a substrate in the form of a core member 26, a base cushion layer 24 formed on the core member, and a protective layer 22 coated on the base cushion layer. In pressure roller 20 flexible hollow filler particles 28 are incorporated in base cushion layer 24.

The core member 26, which has a preferred diameter in a range of approximately between 2.0 inches–4.0 inches, is otherwise similar to core member 16 of fuser roller embodiment 10.

The base cushion layer 24 of pressure roller 20 is preferably a highly crosslinked addition-polymerized polyorganosiloxane material. BCL 24 is made by curing, preferably at a temperature below 100° C., a siloxane formulation which preferably includes three types of filler particles, namely hollow flexible microballoon particles preferably in expanded form, strength-enhancing solid particles, and thermal-conductivity-enhancing solid particles. The polyorganosiloxane material of BCL 24 is preferably a polydimethylsiloxane.

The microballoon particles used for BCL 24 are preferably made from a polymeric material polymerized as a homopolymer or as a copolymer from one or more of the following group of monomers: acrylonitrile, methacrylonitrile, acrylate, methacrylate, and vinylidene chloride. However, any suitable monomer may be used.

The walls of preferably expanded microballoon particles useful for making BCL 24 can include finely divided solid particles. Inorganic particles, e.g., oxide particles, or any other suitable finely divided inorganic particles, can be included in the walls. Preferred oxide particles are silica particles. Additionally or alternatively, the microballoon walls may include finely divided organic polymeric particles.

For the same reasons as given above for BCL 14, it is generally preferable to include expanded microballoons (rather than unexpanded microspheres) in the uncured formulation for making BCL 24. Incorporation of unexpanded microspheres in an uncured formulation for making BCL 24 is, however, not excluded.

Various sizes of microballoon particles in preferably expanded form can be used to make BCL 24 of pressure roller 20. In the manner as described above in reference to BCL 14, a wide variety of tailored size distributions can be assembled and employed in uncured formulations for making BCL 24.

The flexible microballoon particles included in an uncured organosiloxane formulation for making BCL 24 preferably have a predetermined hollow-filler concentration in a range of approximately between 0.25%–3% by weight (w/w), and more preferably, 0.5%–1.5% (w/w). A preferred concentration by volume of hollow flexible microballoon particles included in an uncured organosiloxane formulation is preferably in a range of approximately between 20%–80% (v/v).

A preferred concentration by weight of strength-enhancing solid particles (structural fillers) in an uncured organosiloxane formulation for making BCL 24 is in a range of approximately between 15%–40% (w/w).

For 0.25% (w/w) of hollow flexible microballoon particles in an uncured organosiloxane formulation for making base cushion layer 24, the strength-enhancing solid filler particles in the uncured formulation have a concentration by volume preferably in a range of approximately between 8%–24% (v/v). For 3% (w/w) of the microballoon particles, the strength-enhancing particles in the uncured formulation have a concentration by volume preferably in a range of approximately between 2%–7% (v/v). Therefore, the preferred range for volume percentage of strength–enhancing solid particles in uncured organosiloxane formulations is approximately between 2%–24% (v/v). However, any suitable volume percentage of strength-enhancing solid particles may be used in the uncured organosiloxane formulation for making BCL 24.

A preferred concentration by weight of thermal-conductivity-enhancing solid particles in an uncured organosiloxane formulation for making BCL 24 is in a range of approximately between 10%–40% (w/w).

For 0.25% (w/w) of hollow flexible microballoon particles in an uncured organosiloxane formulation for making base cushion layer 24, the thermal-conductivity-enhancing solid filler particles have a concentration by volume in the uncured formulation preferably in a range of approximately between 4%–24% (v/v). For 3% (w/w) of the microballoon particles, the thermal-conductivity-enhancing particles in the uncured formulation have a concentration by volume preferably in a range of approximately between 1%–7% (v/v). Therefore, the preferred range for volume percentage of thermal-conductivity-enhancing solid particles in uncured organosiloxane formulations is approximately between 1%–24% (v/v). However, any suitable volume percentage of thermal-conductivity-enhancing solid particles may be used in the uncured organosiloxane formulation for making BCL 24.

In an alternative embodiment to pressure roller 20, solid filler particles having primarily a strength-enhancing property are included in an uncured formulation for making BCL 24, and solid filler particles having primarily a thermal-conductivity-enhancing property are omitted.

Preferred for BCL 24 are strength-enhancing solid filler particles and thermal-conductivity-enhancing solid filler particles of similar types and having similar sizes as preferably used for BCL 14.

The base cushion layer 24 preferably has a thermal conductivity in a range of approximately between 0.12 BTU/hr/ft/° F.–0.20 BTU/hr/ft/° F. However, BCL 24 can have any suitable thermal conductivity.

Base cushion layer 24 is characterized by a Shore A durometer preferably in a range of approximately between 30–50.

Base cushion layer 24 preferably has a thickness in a range of approximately between 0.05 inch–0.35 inch.

It is preferred that the protective layer 22 of pressure roller 20 is made of a fluoroelastomer which can include solid filler particles. Preferably, protective layer 22 is similar in all respects to gloss control layer 12 of fuser roller 10.

A preferred relatively hard fuser roller (not illustrated) for use with compliant pressure roller 20 includes a core member with a base cushion layer preferably formed on the core member and a topcoat layer on the base cushion layer. The core member of the relatively hard fuser roller is preferably an aluminum cylinder having an outer diameter in a range between about 4 inches–6.4 inches. The base cushion layer of the relatively hard fuser roller preferably has a thickness in a range of approximately between 0.075 inch–0.125 inch. The thermal conductivity of the base cushion layer is preferred to be in a range of approximately between 0.30 BTU/hr/ft/° F.–0.36 BTU/hr/ft/° F. A preferred base cushion layer of the relatively hard fuser roller is made of an elastomeric material preferably having a Shore A durometer in a range of approximately between 60–75, and more preferably in a range of approximately between 70–75. The base cushion layer preferably includes a thermal-conductivity-enhancing particulate filler. Preferably, the base cushion layer is made of a crosslinked polydimethysiloxane elastomer. The topcoat layer, preferably having a thickness in a range of approximately between 0.0015 inch–0.0040 inch, is preferably made of a fluoropolymer, such as for example the fluorocarbon thermoplastic random copolymer material made from copolymerized vinylidene fluoride, tetrafluoroethylene and hexafluoropropylene disclosed in the Chen, et al., patents (commonly assigned U.S. Pat. Nos. 6,355,352 B1 and 6,429,249). The relatively hard fuser roller can be heated for fusing in any known manner, e.g., using an internal heat source and/or an external heat source. In an alternative embodiment of the relatively hard fuser roller, there is no base cushion layer, the core member being preferably made of any rigid material having a suitably high thermal conductivity and the core member coated with a suitable layer such as a wear-resistant layer, the wear-resistant layer preferably made of any material stable at high temperatures and resistant to damage by fuser oil.

A fusing station including the above-described relatively hard fuser roller and the compliant pressure roller 20 advantageously provides increased fusing station efficiency (throughput) and greatly reduces the frequency of wrinkling of receiver members passing through the fusing nip. This improved performance is due to a lowered modulus (Shore A durometer) resulting from incorporation of hollow microballoons into base cushion layer 24. In addition to these advantages, pressure roller 20 has a relatively simple construction. Moreover, curing of the base cushion layer 24 advantageously requires only a relatively low temperature.

Examples 1 and 2 below describe highly crosslinked addition-polymerized polydimethylsiloxane materials made from uncured formulations including expanded hollow microballoon particles and also including solid strength-enhancing filler particles and solid thermal-conductivity-enhancing filler particles. In these Examples, expanded hollow microballoon particles in amounts of up to 2.0% by weight (about 69% by volume) are added to pre-cured formulations, resulting in post-cured materials having substantially lower tensile modulus than addition-polymerized control materials which contain no added microballoon particles. It has been remarkably found that these observed reductions of tensile modulus are not accompanied by any significant drop in thermal conductivity (measured under negligible compression). This is very surprising, because of the large void volume enclosed by the hollow microballoons. Similarly large void volumes can be present in foamed materials, but the thermal conductivity behavior is different. For example, a closed-cell foam having a high void concentration is typically found to have a much lower thermal conductivity (measured under negligible compression) than the material of the continuous phase in solid form. On the other hand, it is demonstrated by the Examples that inclusion of microballoon hollow filler particles can provide resilient base cushion layer materials which are advantageously considerably softer than prior art base cushion layer materials while retaining thermal conductivities comparable with the prior art addition-polymerized materials.

EXAMPLE 1

Base Cushion Material Suitable for an Externally Heated Fuser Roller

Quantities of hollow microballoons, available as DE 092 particles from Expancel, Duluth, Ga. were mechanically stirred at room temperature into aliquots of a blend of 100 parts RTV S5100A (a crosslinkable polydimethylsiloxane including oxide fillers) and 100 parts S5100B curing agent, both components being available from Emerson and Cuming, Billerica, Mass. The DE 092 particles are flexible hollow microballoons approximately 120 $\mu$m in diameter, manufactured by Expancel in expanded form by thermal expansion of unexpanded microspheres having walls made of a copolymer of polyacrylonitrile and polymethacrylonitrile, the walls incorporating 3%–8% (w/w) finely divided silica. Cured samples 1–4, including a control sample having no added microballoon particles, were made as indicated in columns 1, 2, and 3 of Table 1, i.e., using the S5100 blend as described above. The mixture of blend and DE 092 particles for each sample was injected into a mold and cured with a 0.5-hour ramp to 80° C. followed by a 1-hour hold at 80° C., and then slowly cooled to room temperature. The resulting cured sample plaques were characterized by measuring the thermal conductivity, Shore A durometer, and tensile modulus (see Table 1). Tensile modulus was measured using a Rheometrics RSA II Dynamic Mechanical Analyser (DMA) apparatus. The cured materials of Table 1 are suitable for use as base cushion layers in externally heated fuser rollers of the invention.

TABLE 1

Addition-Polymerized S5100 Base Cushion Layer Materials

| Sample No. | S5100 Blend (grams) | DE 092 Particles (grams) | Microballoon Percentage (w/w) | Thermal Conductivity (BTU/ft/hr/° F.) | Shore A Durometer | DMA Modulus* (Megapascal) 142° C. | 175° C. |
|---|---|---|---|---|---|---|---|
| 1 | 200 | 0 | 0.0 | 0.16 | 33 | 2.06 | 2.15 |
| 2 | 199 | 1 | 0.5 | 0.17 | 32 | — | 1.58 |
| 3 | 198 | 2 | 1.0 | 0.20 | 29 | 1.28 | 1.24 |
| 4 | 196 | 4 | 2.0 | 0.22 | 31 | — | 1.02 |

*DMA modulus for Samples 2 and 4 not measured at 142° C.

Figure 3:
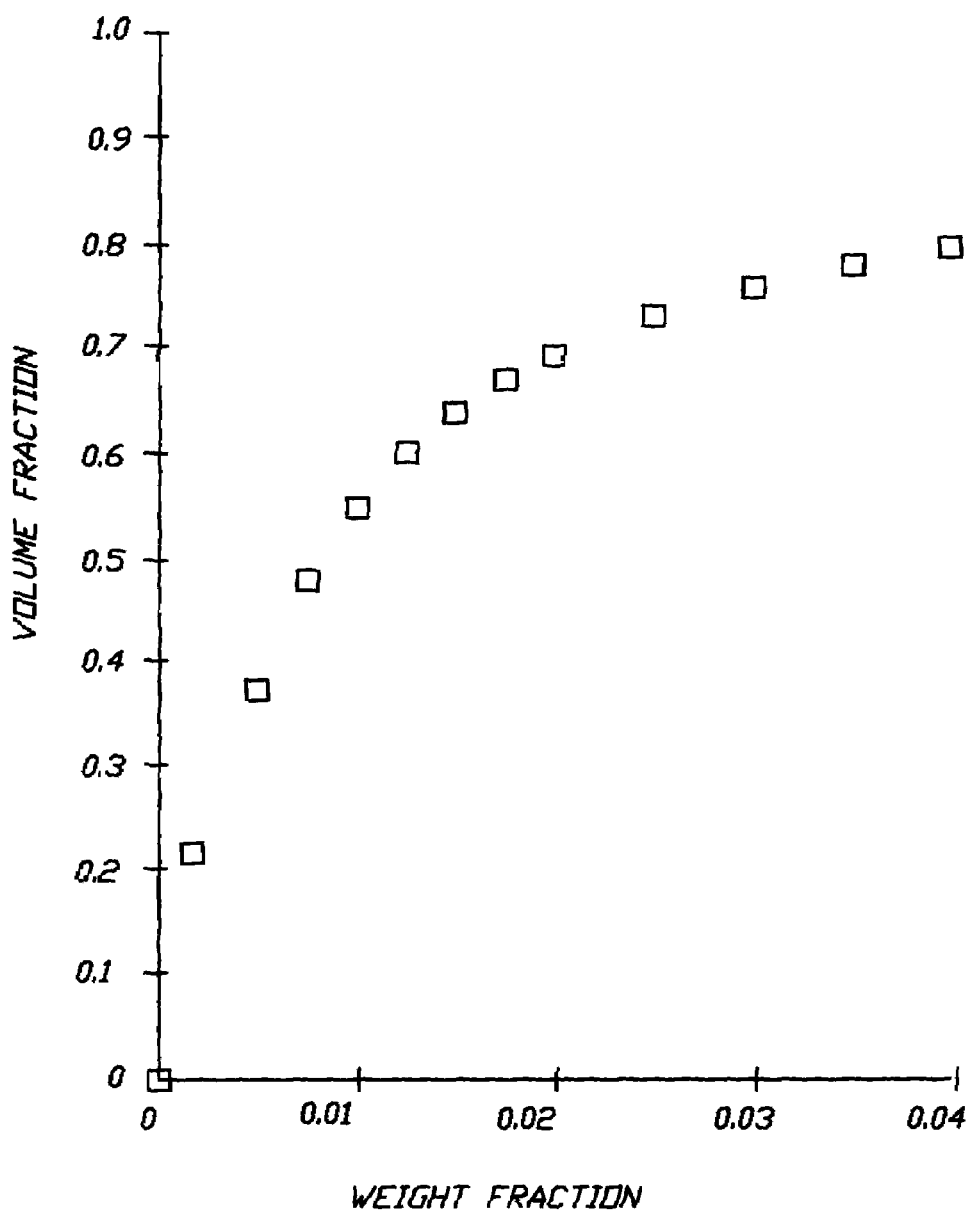
FIG. 3 shows a graph, relevant to uncured formulations described in Example 1, in which volume fraction of hollow microballoons is plotted as a function of weight fraction of hollow microballoons.

In the graph of FIG. 3, which shows the calculated volume fraction as a function of the weight fraction of microballoons in the uncured formulations, the calculated volume fractions of Expancel DE 092 microballoons in uncured formulations having the same ingredients as used to make Samples 1–4 of Table 1 are also included. As illustrated in FIG. 3, large volume fractions of the microballoons correspond to very small weight fractions, i.e., a weight fraction of 0.01 (1% w/w) is equivalent to a volume fraction of 0.59 (59% v/v) in an uncured formulation.

In Table 1, as the weight percent of Expancel DE 092 particles in the uncured formulation (column 3) was increased, i.e., from zero in Sample 1 (control sample) to 2.0% w/w in Sample 4, the measured thermal conductivity (column 5) also increased somewhat. However, at least some of this increase is considered an artifact of the measurement technique. Thermal conductivity was measured using a thermal conductivity analyzer obtained from the Holometric Corporation (model TCA-100) in accordance with the guarded heat flow method described in ASTM-F433-77. The applied load was small so as to minimize compression of the samples, and for each sample the initial thickness of the sample (i.e., prior to mounting in the measuring unit) was used to calculate the thermal conductivity. Nevertheless, in view of the large volume percentages of the microballoons and the softness of the materials, a limited amount of compression (which was not measured) did in fact occur. This compression, noted to be small for all the samples, can account for the systematic increase of thermal conductivity shown in column 5. It may be safely concluded that, in actuality, the thermal conductivity of the cured samples neither increased significantly (nor decreased significantly) when up to 2.0% by weight of microballoons are incorporated into the uncured formulations.

It should be noted that the thermal conductivities of Samples 1–4 are in every case considerably higher than 0.12 BTU/ft/hr/° F. ($5.0 \times 10^{-4}$ cal/cm/sec), which is the upper limit of thermal conductivity for the materials disclosed in the Meguriya patent (U.S. Pat. No. 6,261,214, assigned to Shin-Etsu Chemical Company, Ltd., Tokyo, Japan) cited above.

Column 6 of Table 1 shows the Shore A durometer as measured in standard fashion, with an estimated accuracy of ±2 units. As the weight percent of Expancel DE 092 particles in the uncured formulation (column 3) was increased from zero in Sample 1 (control sample) to 2.0% w/w in Sample 4, the measured Shore A durometer exhibited a decreasing, albeit noisy, trend.

It is well known that small changes in Shore A durometer are reflected in significant changes of mechanical behavior. More sensitive tensile modulus (DMA modulus) data are listed for two temperatures in columns 7 and 8 of Table 1. Thus the DMA modulus measured at 175° C. (column 8) shows a steady and marked decline as the microballoon concentration in the uncured formulation is increased, falling by a factor of more than one-half as the weight percent of microballoons increases from zero to 2.0%.

Example 1 teaches the surprising result that a significant increase in softness, produced by inclusion of a large volume percent of microballoons in an addition-polymerized base cushion silicone rubber, causes substantially no penalty of a reduced thermal conductivity. This result is contrary to expectation because, by analogy with materials such as uncompressed foams in which thermal conductivity is typically lower than that of the solid phase itself, the inclusion of the microballoons might instead have reasonably been expected to produce a reduced thermal conductivity. Such reduced thermal conductivity is disclosed in the Meguriya patent (U.S. Pat. No. 6,261,214) for silicone rubbers incorporating microballoons but not, however, incorporating the thermal-conductivity-enhancing fillers and strength-enhancing fillers of the present invention.

An exemplary externally heated compliant fuser roller according to the invention can be prepared as follows. A cylindrical aluminum core member is cleaned with dichloromethane and dried. The core member is then primed with a uniform coat of an adhesive primer, preferably a metal alkoxide type primer such as Dow® 1200 RTV Prime Coat primer marketed by Dow Corning® Corporation, Midland, Mich., then air dried. 98 parts by weight of a mixture of 100 parts RTV S5100A and 100 parts S5100B curing agent are mechanically stirred with 2 parts by weight of DE 092 expanded microballoon powder, and the resulting mixture is degassed and injection-molded on the core member and dried. The roller is then cured with a 0.5-hour ramp to 80° C., followed by a 1-hour hold at 80° C. and a slow cooling to room temperature, thereby providing an exemplary addition-polymerized base cushion layer on the core member after demolding and grinding as may be suitable. This base cushion layer, which incorporates solid filler particles including aluminum oxide, ferric oxide, and fumed silica, has a thermal conductivity not exceeding about 0.22 BTU/ft/hr/° F. and a tensile modulus of approximately 1 Megapascal. It is preferred to treat the surface of the base cushion layer with a corona discharge, e.g., for about 15 minutes at about 750 watts, and an exemplary gloss control layer or protective layer is then formed on the base cushion layer as follows. 100 parts by weight (w/w) of fluorocarbon thermoplastic random copolymer THV 200A, 10 parts w/w of fluorinated resin, 7.44 parts w/w of zinc oxide particles having a diameter of approximately 7 $\mu$m, and 7 parts w/w aminosiloxane are mixed. THV 200A is a commercially available fluorocarbon thermoplastics random copolymer which is sold by 3M® Corporation, St. Paul, Minn. The zinc oxide particles can be obtained from a convenient commercial source, e.g., Atlantic Equipment Engineers, Bergenfield, N.J. The aminosiloxane is preferably Whitford's Amino, an amine-functionalized PDMS oil commercially available from Whitford. The fluorinated resin is preferably fluoroethylenepropylene (FEP), commercially available from DuPont, Wilmington, Del. The ingredients are mixed with 1 part w/w of Curative 50 catalyst (from DuPont) on a two-roll mill, then dissolved to form a 25 weight percent solids solution in methyl ethyl ketone. The resulting material is ring coated onto the cured base cushion layer, air dried for 16 hours, baked with a 2.5 hour ramp to 275° C., held at 275° C. for 30 minutes, then held 2 hours at 260° C. and cooled slowly to room temperature. The ring coating and curing procedure can be repeated multiple times using the methyl ethyl ketone solution, resulting after, for example, two repetitions in an outer gloss control layer of fluorocarbon random copolymer having a thickness of about 0.002 inch, and a thermal conductivity in the neighborhood of about 0.081 BTU/hr/ft/° F.

EXAMPLE 2

Base Cushion Material Suitable for an Internally Heated Fuser Roller

Table 2 shows the effect of adding Expancel 092 microballoons to an uncured formulation for making a relatively high modulus addition-polymerized base cushion material having a relatively high thermal conductivity. The uncured formulation for Sample 5 (no microballoons included) was a blend of an RTV component with a curing agent, the RTV component being similar in character to the RTV component of Example 1 but having a higher total concentration of solid filler particles including aluminum and ferric oxides and fumed silica. The post-cured values of thermal conductivity, Shore A durometer, and DMA modulus for Sample 5 (columns 3, 4 and 5 of Table 2) are all considerably higher than the corresponding values for Sample 1 in Table 1, which higher values are caused by the higher filler loading. The RTV and curing agent for making the cured materials of Table 2 are available from Emerson and Cuming, Billerica, Mass., under a product identification number LS9816-26-1.

TABLE 2

Base Cushion Layer Materials Having Relatively High Thermal Conductivity

| Sample No. | Microballoon Percentage (w/w) | Thermal Conductivity (BTU/ft/hr/° F.) | Shore A Durometer | DMA Modulus @ 175° C. (Megapascal) |
|---|---|---|---|---|
| 5 | 0.0 | 0.37 | 62 | 6.28 |
| 6 | 0.5 | 0.38 | 58 | not measured |

The uncured formulation for making Sample 6 (control sample) was obtained by mechanically stirring 0.5 weight percent of Expancel DE 092 microballoons into an uncured LS9816-26-1 blend having the same composition as that used for making Sample 5. Both of Samples 5 and 6 were cured with a 0.5-hour ramp to 80° C. followed by a 1-hour hold at 80° C. and a slow cooling to room temperature, i.e., in the same manner as for Example 1. It can be seen from Table 2 that the addition of 0.5% w/w of the DE 092 microballoons in Sample 6 produced a 6.5 percent reduction of the Shore A durometer, with no decrease in measured thermal conductivity (thermal conductivity measured as for Example 1, with the slight increase of 0.01 BTU/ft/hr/° F. for Sample 6 being attributable to a smaller amount of compression during the measurement than for Example 1). Considerably lower Shore A durometer can be achieved by inclusion of higher concentrations of microballoons in uncured formulations. Example 2 demonstrates that, despite an elevated concentration of solid filler particles by comparison with Example 1, the benefit of adding microballoons is nevertheless still obtained.

An exemplary internally heated compliant fuser roller according to the invention having relatively high thermal conductivity can be prepared from the LS9816-26-1 blend in the same manner as described above for making the exemplary fuser roller from the S5100 formulation. Thus a similar core member cleaned with dichloromethane and dried, the core member subsequently primed with Dow® 1200 RTV Prime Coat primer and then air dried. The LS9816-26-1 blend is mechanically stirred with a predetermined weight percentage of DE 092 expanded microballoon powder, the resulting mixture is degassed and injection-molded on the core member and dried. The roller is then cured with a 0.5-hour ramp to 80° C., followed by a 1-hour hold at 80° C. and a slow cooling to room temperature, so as to provide an exemplary relatively stiff addition-polymerized base cushion layer on the core member, the base cushion layer having a thermal conductivity of about 0.37 BTU/ft/hr/° F. and a tensile modulus of approximately 6 Megapascal. An exemplary gloss control layer or protective layer is then formed on the base cushion layer in a manner as described above for the exemplary fuser roller having base cushion layer made of S5100 material, the gloss control layer preferably made of the same fluorocarbon random copolymer material ring coated and then cured on top of the cured base cushion layer in similar fashion, i.e., with a 2.5 hour ramp to 275° C., held at 275° C. for 30 minutes, then held 2 hours at 260° C. and cooled slowly to room temperature, with the ring coating and curing procedure repeated multiple times as necessary to produce a suitable outer gloss control layer of fluorocarbon random copolymer material (inclusive of appropriate fillers) having a thermal conductivity of about 0.081 BTU/hr/ft/° F.

Thus both externally heated and internally heated fuser rollers of the invention can be made having base cushion layers thermally cured from polyorganosilicone formulations containing hollow microballoon particles. A fuser roller having a base cushion layer of the invention made with addition-polymerized material such as LS9816-26-1 inclusive of hollow microballoon particles is preferably provided with an internal heat source. By contrast, a fuser roller having a base cushion layer of the invention made with addition-polymerized material such as S5100 inclusive of hollow microballoon particles preferably has an external heat source (preferably plus an intermittently activated auxiliary internal heat source) as described above.

It will be evident that an exemplary compliant pressure roller of the invention can also be made having an addition-polymerized base cushion layer thermally cured from S5100 or LS9816-26-1 formulations similar to those described above for exemplary fuser rollers, the pressure roller provided with an outer protective layer made for example of fluorocarbon random copolymer material formed on the base cushion layer, and wherein the concentrations of incorporated hollow microballoons, strength-enhancing solid fillers and thermal-conductivity-enhancing solid fillers in the base cushion layer are adjusted in a manner appropriate to specific applications.

A general method of making a fusing-station member for use in a fusing station of an electrostatographic machine is now described. The fusing-station member is formed from a substrate, an addition-polymerized base cushion layer adhered to the substrate and a protective layer coated on the base cushion layer, the method including the steps of:

mixing of ingredients so as to produce an uncured formulation, the ingredients including a vinyl-substituted polyorganosiloxane, a silane-substituted polyorganosiloxane, about 1–100 parts per million by weight of a platinum curing catalyst which is preferably chloroplatinic acid, flexible hollow filler particles, strength-enhancing solid filler particles, and thermal-conductivity-enhancing solid filler particles, wherein the flexible hollow filler particles have a concentration in the uncured formulation of about 0.25%–3% by weight; degassing the uncured formulation; contacting the substrate with a thermally curable layer of the uncured formulation, the substrate priorly coated with a uniform coating of an adhesive primer, the contacting coincident with forming the thermally curable layer with a uniform thickness on the substrate; ramp heating the thermally curable layer and the substrate from a room temperature to an elevated temperature, the elevated temperature preferably not greater than 100° C.; continuing to heat the thermally curable layer and the substrate at a temperature preferably not greater than 100° C. until the thermally curable layer is fully cured via an addition-polymerization reaction; cooling the thermally curable layer and the substrate to a room temperature so as to obtain the base cushion layer as an addition-polymerized layer adhered to the substrate; and coating the protective layer on the base cushion layer. In the above method, the flexible hollow filler particles preferably have an expanded form, the expanded form priorly produced from microspheres having an unexpanded form, i.e., manufactured from the microspheres via thermal expansion prior to inclusion in the uncured formulation.

The method can be applied to making the fusing-station member as a roller, either as a fuser roller or as a pressure roller, wherein the substrate is a rigid cylindrical core member and wherein the aforementioned contacting involves injecting the uncured formulation into a cylindrical mold concentric with the rigid cylindrical core member.

The method can alternatively be applied to making the fusing-station member in the form of a web, the aforementioned substrate included in the web.

In summary, the invention provides improved compliant fuser rollers or pressure rollers of simple construction, the rollers inclusive of low-temperature-cured addition-polymerized base cushion layers incorporating hollow microballoon filler particles. By comparison with prior art rollers which do not include hollow microballoon filler particles, the compliant fusing-station rollers of the invention provide relatively softer rollers (i.e., lower Shore A durometer) having thermal conductivities surprisingly not lower than those of the prior art rollers. Thus fusing-station rollers of the invention can provide wider fusing nips (i.e., longer fusing times) with nip pressures similar to those used for fusing stations employing prior art rollers not incorporating hollow microballoon filler particles, thereby increasing fusing productivity. Alternatively, with throughput of fused receiver members through the fusing station similar to that using a prior art compliant fusing-station roller, the fusing nip pressure can be reduced with no loss of productivity, thereby reducing fusing artifacts such as wrinkles as well as reducing mechanical damage to the roller such as caused by the edges of receiver members.

The invention has been described in detail with particular reference to certain preferred embodiments thereof, but it will be understood that variations and modifications can be effected within the spirit and scope of the invention.

What is claimed is:

1. For use in a fusing station of an electrostatographic machine, an elastically deformable fusing-station roller, said fusing-station roller comprising:
   a core member, said core member being substantially rigid and having a cylindrical outer surface;
   a base cushion layer, said base cushion layer formed on said core member;
   a protective layer coated on said base cushion layer;
   wherein said base cushion layer is a thermally cured polyorganosiloxane material made by an addition-polymerization of an uncured formulation, said uncured formulation including hollow filler particles in form of microballoons having flexible walls, said microballoons having a predetermined hollow-filler concentration in said uncured formulation, and said uncured formulation further including solid filler particles;
   wherein the thermal conductivity of said base cushion layer is in a range of approximately between 0.2 BTU/hr/ft/° F.–0.7 BTU/hr/ft/° F.; and
   wherein said addition-polymerization of said uncured formulation is carried out at a temperature below 100° C.

2. The fusing-station roller of claim 1, wherein said solid filler particles include strength-enhancing filler particles.

3. The fusing-station roller of claim 2, wherein said strength-enhancing filler particles are members of a group including particles of silica, zirconium oxide, boron nitride, silicon carbide, and tungsten carbide.

4. The fusing-station roller of claim 2, wherein said fusing-station roller is one of an externally heated fuser roller and a pressure roller, and wherein said strength-enhancing filler particles have a concentration in said uncured formulation in a range of approximately between 15%–40% by weight.

5. The fusing-station roller of claim 2, wherein said fusing-station roller is an internally heated fuser roller and wherein said strength-enhancing filler particles have a concentration in said uncured formulation in a range of approximately between 5%–10% by weight.

6. The fusing-station roller of claim 1, wherein said solid filler particles include thermal-conductivity-enhancing filler particles.

7. The fusing-station roller of claim 6, wherein said thermal-conductivity-enhancing filler particles are selected from a group including particles of aluminum oxide, iron oxide, copper oxide, calcium oxide, magnesium oxide, nickel oxide, tin oxide, zinc oxide, graphite, carbon black, and mixtures thereof.

8. The fusing-station roller of claim 6, wherein said fusing-station roller is one of an externally heated fuser roller and a pressure roller, and wherein said thermal-conductivity-enhancing filler particles have a concentration in said uncured formulation in a range of approximately between 10%–40% by weight.

9. The fusing-station roller of claim 6, wherein said fusing-station roller is an internally heated fuser roller and wherein said thermal-conductivity-enhancing filler particles have a concentration in said uncured formulation in a range of approximately between 40%–70% by weight.

10. The fusing-station roller of claim 1, wherein said microballoons in said uncured formulation are distinguishable by at least one size.

11. The fusing-station roller of claim 1, wherein said microballoons in said uncured formulation have diameters of up to approximately 120 $\mu$m.

12. The fusing-station roller of claim 1, wherein said predetermined hollow-filler concentration of said microballoons is in a range of approximately between 0.25%–3.0% by weight in said uncured formulation.

13. The fusing-station roller of claim 12, wherein said predetermined hollow-filler concentration of said microballoons is in a range of approximately between 0.5%–1.5% by weight in said uncured formulation.

14. The fusing-station roller of claim 1, wherein said addition-polymerization is carried out at a temperature which does not substantially exceed 80° C.

15. The fusing-station roller of claim 1, wherein said microballoons comprise a polymeric material, said polymeric material polymerized from monomers selected from the following group of monomers: acrylonitrile, methacrylonitrile, acrylate, methacrylate, vinylidene chloride, and combinations thereof.

16. The fusing-station roller of claim 1, wherein said flexible walls of said microballoons include finely divided particles selected from a group including inorganic particles and organic polymeric particles.

17. The fusing-station roller of claim 1, wherein said base cushion layer comprises a crosslinked polydimethylsiloxane.

18. The fusing-station roller of claim 17, wherein said fusing-station roller is a fuser roller, said fuser roller being externally heated.

19. The fusing-station roller of claim 18, wherein:
said fuser roller is provided with an auxiliary internal source of heat; and
said thermal conductivity of said base cushion layer in a range of approximately between 0.2 BTU/hr/ft/° F.–0.5 BTU/hr/ft/° F.

20. The fusing-station roller of claim 19, wherein:
said thermal conductivity of said base cushion layer is in a range of approximately between 0.2 BTU/hr/ft/° F.–0.4 BTU/hr/ft/° F.

21. The fusing-station roller of claim 17, wherein said fusing-station roller is a fuser roller, said fuser roller being internally heated.

22. The fusing-station roller of claim 21, wherein:
said fusing-station roller is provided with an auxiliary internal source of heat; and
said thermal conductivity of said base cushion layer is in a range of approximately between 0.2 BTU/hr/ft/° F.–0.7 BTU/hr/ft/° F.

23. The fusing-station roller of claim 22, wherein:
said thermal conductivity of said base cushion layer is in a range of approximately between 0.2 BTU/hr/ft/° F.–0.5 BTU/hr/ft/° F.

24. The fusing-station roller of claim 17, wherein a thickness of said base cushion layer is in a range of approximately between 0.05 inch–0.35 inch.

25. The fusing-station roller of claim 17, wherein said fusing-station roller is one of an externally heated fuser roller and a pressure roller, and wherein a Shore A durometer of said base cushion layer is in a range of approximately between 30–50.

26. The fusing-station roller of claim 17, wherein said fusing-station roller is an internally heated fuser roller, and wherein a Shore A durometer of said base cushion layer is in a range of approximately between 30–75.

27. The internally heated fuser roller of claim 26, wherein said Shore A durometer of said base cushion layer is in a range of approximately between 50–70.

28. The fusing-station roller according to claim 1, wherein said protective layer comprises a chemically unreactive, low surface energy, flexible, polymeric material suitable for high temperature use.

29. The fusing-station roller according to claim 1, wherein said solid filler particles have a mean diameter in a range of approximately between 0.1–100 $\mu$m.

30. The fusing-station roller according to claim 29, wherein said solid filler particles have a mean diameter in a range of approximately between 0.5–40 $\mu$m.

31. For use in a fusing station of an electrostatographic machine, an elastically deformable fusing-station roller, said fusing-station roller comprising:
a core member, said core member being substantially rigid and having a cylindrical outer surface;
a base cushion layer, said base cushion layer formed on said core member;
a protective layer coated on said base cushion layer;
wherein said base cushion layer is a thermally cured polyorganosiloxane material made by an addition-polymerization of an uncured formulation, said uncured formulation including hollow filler particles in form of microballoons having flexible walls, said microballoons having a predetermined hollow-filler concentration in said uncured formulation, and said uncured formulation further including solid filler particles;
wherein said protective layer comprises a chemically unreactive, low surface energy, flexible, polymeric material suitable for high temperature use;
wherein said protective layer is a gloss control layer;
a thermal conductivity of said gloss control layer is in a range of approximately between 0.07 BTU/hr/ft/° F.–0.11 BTU/hr/ft/° F.; and
a thickness of said gloss control layer is in a range of approximately between 0.001 inch–0.004 inch; and
wherein said addition-polymerization of said uncured formulation is carried out at a temperature below 100° C.; and wherein the thermal conductivity of said base cushion layer is in a range of approximately between 0.2 BTU/hr/ft/° F.–0.7 BTU/hr/ft/° F.

32. The fusing-station roller of claim 31, wherein said gloss control layer comprises a fluoropolymer.

33. The fusing-station roller of claim 32, wherein said fluoropolymer is a random copolymer, said random copolymer made of monomers of vinylidene fluoride ($CH_2CF_2$), hexafluoropropylene ($CF_2CF(CF_3)$), and tetrafluoroethylene ($CF_2CF_2$), said random copolymer having subunits of:

—($CH_2CF_2$)x-, —($CF_2CF(CF_3)$)y-, and —($CF_2CF_2$)z-, wherein,
x is from 1 to 50 or from 60 to 80 mole percent of vinylidene fluoride,
y is from 10 to 90 mole percent of hexafluoropropylene,
z is from 10 to 90 mole percent of tetrafluoroethylene, and
x+y+z equals 100 mole percent.

34. The fusing-station roller of claim 33, wherein:
said gloss control layer comprises a particulate filler;
said particulate filler has a particle size in a range of approximately between 0.1 $\mu$m–10 $\mu$m;
said particulate filler has a total concentration in said gloss control layer of less than about 20% by weight;
said particulate filler includes zinc oxide particles and fluoroethylenepropylene resin particles;
said zinc oxide particles have a concentration in a range of approximately between 5%–7% by weight; and
said fluoroethylenepropylene resin particles have a concentration in a range of approximately between 7%–9% by weight.

35. For use in a fusing station of an electrostatographic machine, an elastically deformable fusing-station member, said elastically deformable fusing-station member comprising:
a substrate;
a base cushion layer, said base cushion layer formed on said substrate;
a protective layer coated on said base cushion layer;
wherein said base cushion layer is a thermally cured polyorganosiloxane material made by an addition-polymerization of an uncured formulation, said uncured formulation including hollow filler particles in the form of microballoons having flexible walls, said microballoons having a predetermined hollow-filler concentration in said uncured formulation, and said uncured formulation further including solid filler particles;
wherein the thermal conductivity of said base cushion layer is in a range of approximately between 0.2 BTU/hr/ft/° F.–0.7 BTU/hr/ft/° F.; and
wherein said addition-polymerization of said uncured formulation is carried out at a temperature below 100° C.

* * * * *